US006437459B1

(12) United States Patent
Politi

(10) Patent No.: US 6,437,459 B1
(45) Date of Patent: Aug. 20, 2002

(54) MOTORCYCLE SAFETY AND LOCK REMINDER SYSTEM

(76) Inventor: Nadav Politi, Sokolov 5, Holon (IL)

( * ) Notice: Subject to any disclaimer, the term of this patent is extended or adjusted under 35 U.S.C. 154(b) by 0 days.

(21) Appl. No.: 09/759,129

(22) Filed: Jan. 16, 2001

(51) Int. Cl.[7] .................................................. B62J 11/00
(52) U.S. Cl. ......................... 307/9.1; 340/427; 340/457
(58) Field of Search ................................. 307/9.1, 10.1, 307/10.2, 10.3; 340/427, 457

(56) References Cited

U.S. PATENT DOCUMENTS

| 5,184,584 A | 2/1993 | Cantrell |
| 5,519,376 A | 5/1996 | Iijima |
| 5,823,025 A | 10/1998 | Phifer |
| 6,178,787 B1 | 1/2001 | Titterton |
| 6,230,530 B1 * | 5/2001 | Voigt et al. ..................... 70/441 |

FOREIGN PATENT DOCUMENTS

| DE | 29618287 | * | 1/1997 | ............ B62H/5/00 |
| DE | 19713256 | * | 10/1998 | ............ B62J/11/00 |
| DE | 19723470 | * | 12/1998 | ............ B62J/11/00 |
| DE | 29903354 | * | 9/1999 | ............ B62H/5/18 |
| DE | 20002685 | * | 5/2000 | ............ B62H/5/18 |

* cited by examiner

*Primary Examiner*—Fritz Fleming
(74) *Attorney, Agent, or Firm*—Mark M. Friedman

(57) ABSTRACT

A safety system for reminding an operator of a motorcycle to remove a lock from a disc rotor of a brake of the motorcycle and for reminding the operator to replace the lock in a storage location on the motorcycle, the motorcycle requiring function of an electrical circuit for starting the motorcycle, is disclosed. The system comprises a sensing mechanism for sensing that the lock is present in the storage location, the sensing mechanism operatively connected to, a switching mechanism operatively connected to the required electrical circuit of the motorcycle for controlling current flow through the required electrical circuit, whereby the motorcycle is prevented from starting unless the lock is present in the storage location.

9 Claims, 4 Drawing Sheets

MOTORCYCLE SAFETY AND LOCK REMINDER SYSTEM

FIELD AND BACKGROUND OF THE INVENTION

The present invention relates to a motorcycle safety system and, more particularly, to a motorcycle brake disc lock reminder and safety system.

The popularity and sales of motorcycles, as well as their cost, have grown and along with this growth has been a parallel increase in motorcycle theft. According to a survey of insurance companies by the National Insurance Crime Bureau, motorcycle-theft claims in the U.S. rose 46 percent in the period 1992–95 alone. As a result there has been an increased utilization of anti-theft devices such as alarms and locks. One such lock device that is very popular and highly recommended is the brake disc lock.

A motorcycle's brake rotor (also known as a brake disc) is relatively thin and easily passes between the brake's calipers, which engage the disc when the brakes are applied, in order to slow and stop the motorcycle. The brake disc lock is a small but sophisticated device which fastens onto the brake rotor disc and which is of sufficient thickness such that it cannot pass between the brake calipers or the wheel fork. As a result the wheel can only rotate a short distance in either direction before it is abruptly stopped.

One serious problem with this type of lock, though, is that it can be extremely dangerous to the rider and damaging to the motorcycle, if the operator were to inadvertently start the motorcycle and try to drive off, without first removing the lock from the brake rotor. If the operator starts to drive off with lock still fastened to the rotor, the motorcycle would move properly for a few feet until the lock engages with the brake calipers or fork. At that point, the wheel's rotation would come to an immediate and sudden stop. The rapid engagement of the lock with the brake calipers could damage the brake calipers and/or the rotor. More importantly, such a sudden stop would likely result in the rider being thrown over the motorcycle's handlebars, thus injuring the rider.

As this is a common problem, in order to prevent this from happening, a variety of approaches have been tried to remind the operator to detach the lock before starting the motorcycle. For example, the lock can be painted a bright color so that the operator will notice it on approaching the vehicle and will remember to detach it. Other approaches rely on reminders such as plastic "key" that can be inserted into the ignition lock to serve as a reminder to the operator to detach the lock before starting the vehicle's engine. Approaches like these however have the limitation that they require the user to actively employ or set the reminder in order for them to be effective. Another approach is that disclosed in U.S. Pat. No. 5,823,025 to Phifer which employs a "lock-out" mechanism. In order to attach the lock to the brake rotor, the lock out device must first be removed from the lock. This requires the insertion of the ignition key into the lock out mechanism. This then prevents the motorcycle from being operated when the lock is in place because the lock-out mechanism retains the ignition key. This approach, which involves a mechanical device, is awkward, complicated to use and inconvenient.

There is thus a widely recognized need for, and it would be highly advantageous to have, a motorcycle disc brake lock reminder and safety system devoid of the above limitations.

SUMMARY OF THE INVENTION

According to the present invention there is provided a safety system for reminding an operator of a motorcycle to remove a lock from a disc rotor of a brake of the motorcycle and for reminding the operator to replace the lock in a storage location on the motorcycle, the motorcycle requiring function of an electrical circuit for starting the motorcycle, the system including: (a) a sensing mechanism for sensing that the lock is present in the storage location, the sensing mechanism operatively connected to, (b) a switching mechanism operatively connected to the electrical circuit of the motorcycle for controlling current flow through the electrical circuit, whereby the motorcycle is prevented from starting unless the lock is present in the storage location.

According to further features in preferred embodiments of the invention described below, the system further includes a resistance mechanism, the resistance mechanism being connected in a parallel circuit with the switching mechanism, wherein the resistance mechanism is of sufficient resistance such that the resistance mechanism draws sufficient current such that the required electrical circuit will function only if said switching mechanism allows current flow through said switching mechanism.

According to still further features in the described preferred embodiments, the resistance device further includes a mechanism for delivering an alert.

According to still further features in the described preferred embodiments, the switching mechanism includes a microswitch.

According to still further features in the described preferred embodiments, the sensing mechanism further includes a storage bracket, whereby placement of the lock in the storage bracket serves to operatively engage the microswitch so as to permit current flow through the switching mechanism.

According to still further features in the described preferred embodiments, the system further includes an identifier mechanism attached to the lock for causing the lock to be detectable by the sensing mechanism.

According to still further features in the described preferred embodiments, the identifier mechanism is a magnet, and the sensing mechanism senses the presence of a magnet.

According to still further features in the described preferred embodiments, the identifier mechanism includes a mechanism for uniquely distinguishing the lock from any other lock, and the sensing mechanism includes a recognition mechanism for specifically detecting the unique distinguishing mechanism.

According to still further features in the described preferred embodiments, the unique distinguishing mechanism is selected from the group consisting of a machine readable bar code, a uniquely identifiable magnetic strip, an electronic chip, a radio transmitter, an infrared transmitter, and an ultrasound transmitter.

According to still further features in the described preferred embodiments, the system further includes a bypass switch, connected to the switching mechanism, for bypassing the switching mechanism.

The present invention successfully addresses the shortcomings of the presently known configurations by providing a motorcycle disc brake lock reminder and safety system that can be used to prevent injury to the motorcycle driver and damage to the motorcycle, by preventing operation of the motorcycle unless the disc brake lock is properly stored. Further, in those embodiments where a unique distinguishing mechanism is used, the system of the present invention also functions as an anti-theft, theft deterrent system.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
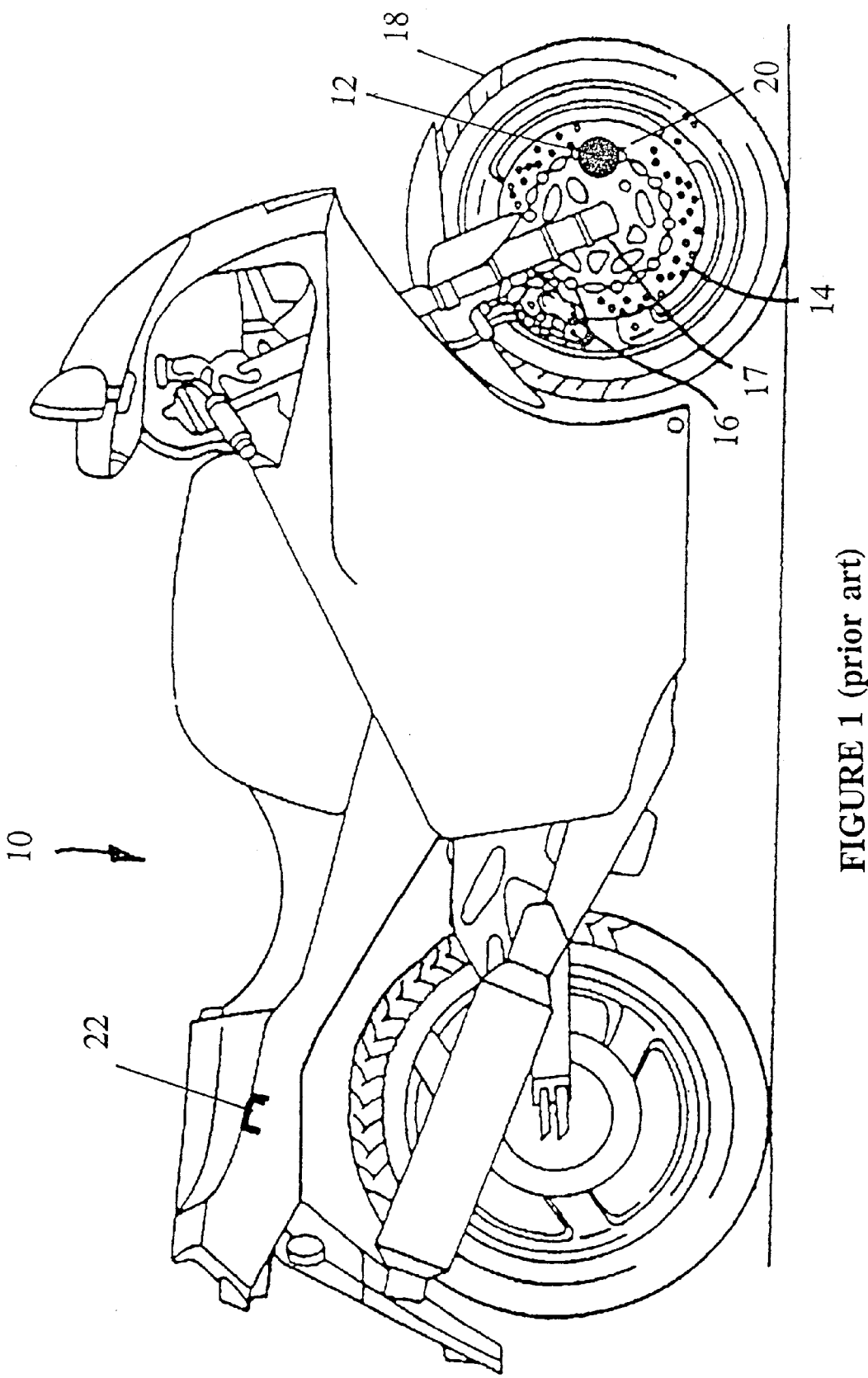
FIG. 1 is a side view of a motorcycle with a brake disc lock in locking position (prior art), also showing the storage location of the present invention.

The present invention is of a motorcycle disc brake lock reminder and safety system that can be used to prevent injury to the motorcycle driver and damage to the motorcycle. Specifically, the present invention can be used to prevent operation of the motorcycle unless the disc brake lock is properly stored.

The principles and operation of a motorcycle brake disc lock reminder and safety system according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

For purposes of this specification and the accompanying claims, the terms "operator," "driver," and "rider" are used interchangeably throughout this specification and the accompanying claims to refer to the operator of the motorcycle.

For purposes of this specification and the accompanying claims, the terms "brake rotor," "brake disc," "rotor disc," and "disc rotor" are used interchangeably throughout this specification and the accompanying claims to refer to the rotating metal disc attached to the motorcycle's wheel which is compressed by the brake calipers to slow and stop the motorcycle.

For purposes of better understanding the present invention, as illustrated in the drawings, reference is first made to the construction and operation of a conventional (i.e., prior art) motorcycle brake disc lock as illustrated in FIG. 1. FIG. 1 illustrates a motorcycle (10) with a brake disc lock (12) in place securing motorcycle 10. Lock 12 is fastened onto the brake disc rotor (14). This is known as the locking position (20) of lock 12. Because of the size of lock 12, lock 12 will not pass through brake calipers 16 or fork 17 and the rotation of wheel 18 will be stopped. FIG. 1 also illustrates the storage location 22 of lock 12 where lock 12 is stored when lock 12 is not fastened to brake disc 14.

Figure 2A:
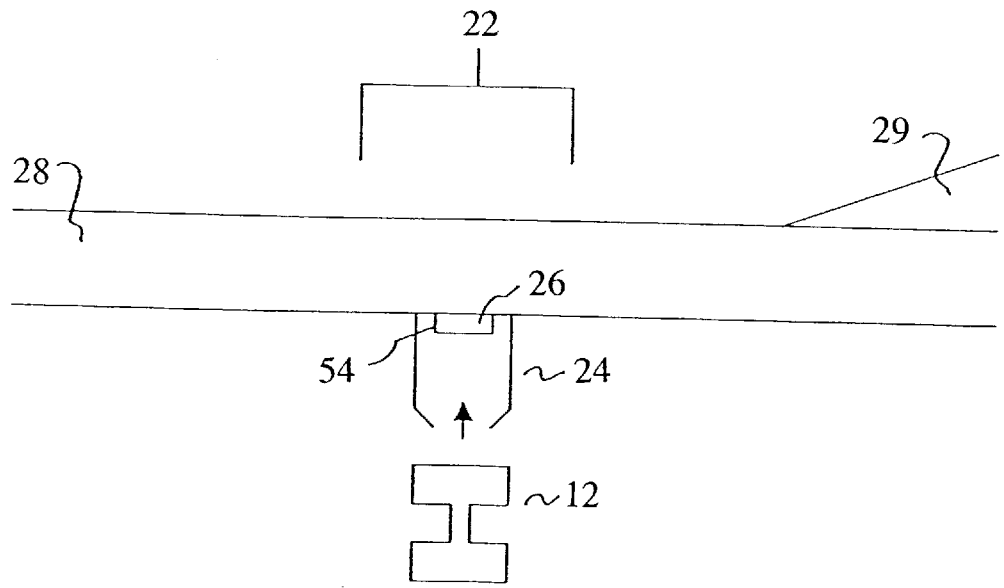
FIG. 2A is a schematic depiction of a preferred embodiment of the system of the present invention.
Figure 3A:
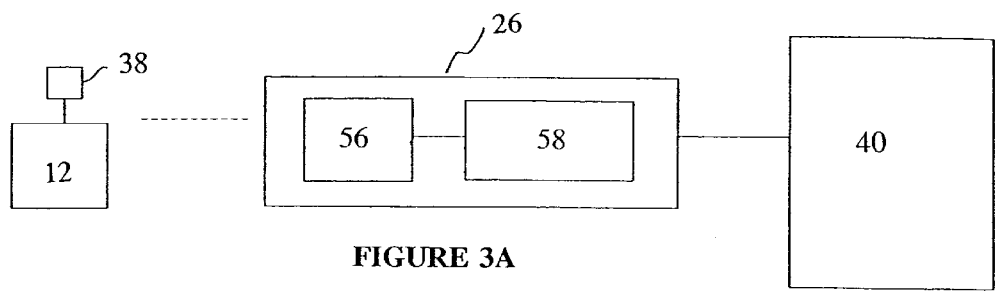
FIG. 3A is a functional block diagram illustrating components and connections of a preferred embodiment of the system of the present invention.

According to the present invention, at storage location 22 there is a storage holder 24 that serves to hold and store lock 12 when it is not in use. This is illustrated in FIG. 2A. Storage holder 24 may be, for example, a bracket, clamp, clip, strap, cup, receptacle, recess or other such device as may be used to hold and store lock 12, and the precise structure and location of storage holder 24 may vary depending on the exact configuration of the system of the present invention. In a preferred embodiment of the present invention as illustrated in FIG. 2A, storage holder 24 takes the form of a bracket attached to the frame 28 of motorcycle 10. Storage location 22 is preferably behind or under seat 29, but can be located anywhere on the motorcycle. Adjacent to storage holder 24 and operatively associated with holder 24 is a detector 26. Detector 26 serves to detect the presence of lock 12 in its storage holder. Therefore, when detector 26 detects the presence of lock 12 it is deduced that lock 12 has been replaced in the storage location of lock 12, and if detector 26 fails to detect lock 12 in its storage holder, it is deduced that lock 12 may be in locking position 20. The system of the present invention functions such that if the operator of motorcycle 10 attempts to start motorcycle 10 without lock 12 being replaced in its storage location, an alert is given and the motorcycle will not start. If on the other hand detector 26 detects that lock 12 is located in storage location 22, the system of the present invention will allow motorcycle 10 to be started. As illustrated in FIG. 3A, detector 26 thus contains a sensing mechanism 56 for sensing the presence of lock 12 in storage location 22 and a switching mechanism 58 (for allowing motorcycle 10 to start and for preventing motorcycle 10 from starting) attached to the electrical starter circuit 40 of motorcycle 10.

Figure 3B:
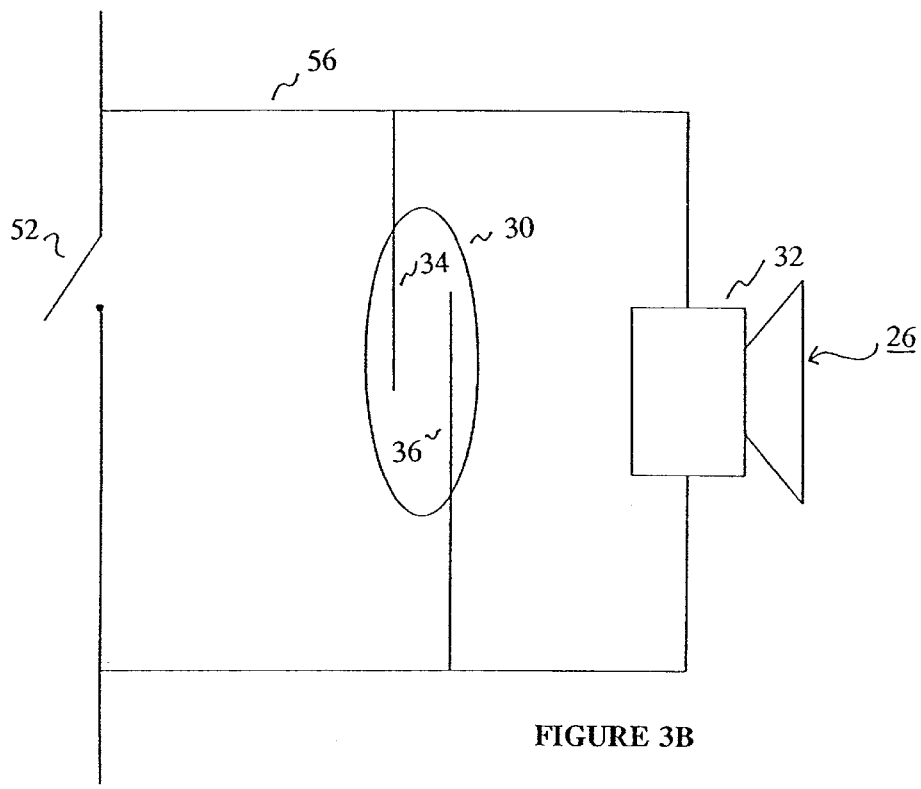
FIG. 3B is a schematic diagram illustrating components and connections of a preferred embodiment of the detector of the present invention.

A preferred embodiment of detector 26 itself is further illustrated schematically in the diagram of FIG. 3B. Detector 26 includes components of electrical circuitry 56 including sensor switch 30 (which combines mechanism for sensing 56 the presence of lock 12 in storage location 22 and switching mechanism 58 into a single sensor switch 30) and resistance device 32. Sensor switch 30 is closed when lock 12 is located in storage location 22. Sensor switch 30 can be, for example, but not limited to, a micro-switch depressed when lock 12 is replaced into storage holder 24. In a preferred embodiment of the present invention in which sensor switch 30 is a microswitch, storage holder 24 is so constructed as to insure that placement of lock 12 within operatively engages microswitch 30. In another preferred embodiment of the system of the present invention, sensor switch 30 is a switch which closes when in proximity to a magnet; a magnetic field causes the two metal leaves 34 and 36 to come into contact with one another, closing the switch.

Figure 2B:
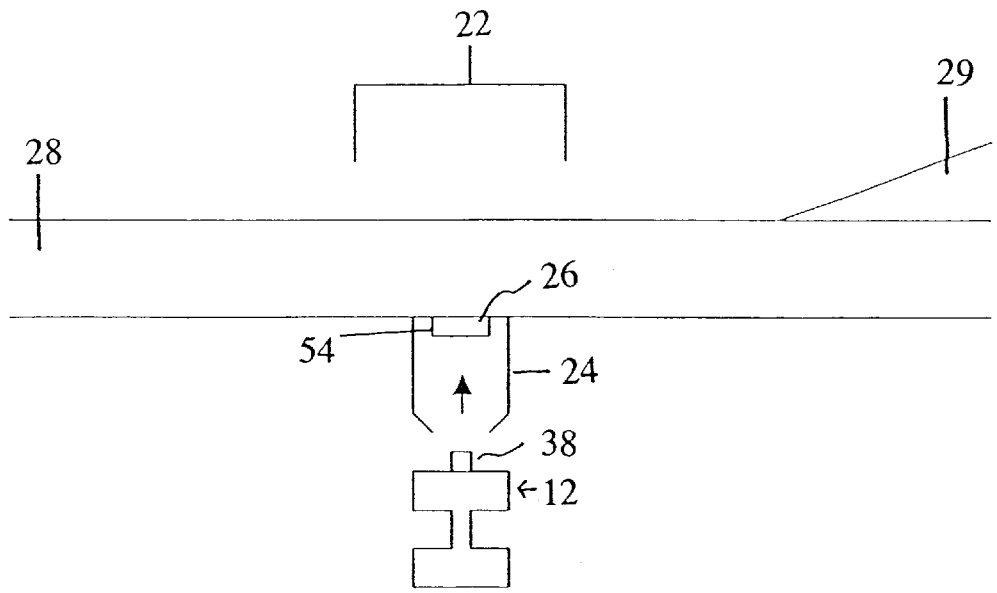
FIG. 2B is a schematic depiction of an alternate preferred embodiment of the system of the present invention, further comprising an identifier.

Another preferred embodiment of the safety and reminder system of the present invention is further illustrated in FIG. 2B. Here an identifier 38 is attached to lock 12, using an adhesive material or any other material for reversibly or irreversibly attaching two pieces as is known in the art. In some embodiments of the present invention, identifier 38 is not unique, that is, it does not uniquely identify one specific individual lock. In such an embodiment, identifier 38 can be for example, but not limited to, a magnet. In such an embodiment, whenever any given lock 12, with a magnet attached acting as identifier 38, is replaced in storage location 22, sensor switch 30 closes and the system of the present invention allows motorcycle 10 to be started.

Figure 3C:
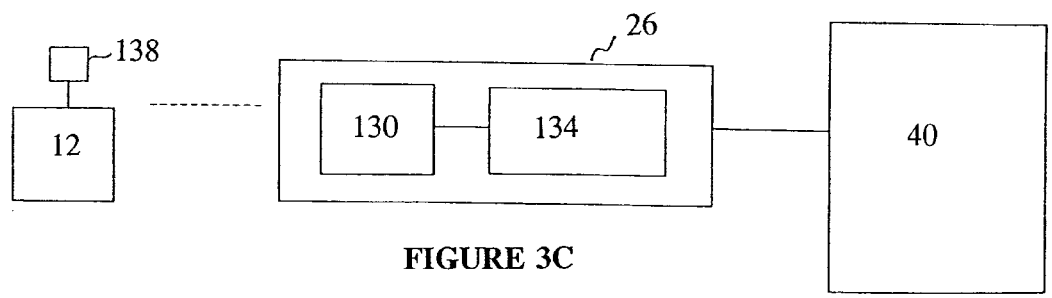
FIG. 3C is a functional block diagram of an alternate preferred embodiment of the system of the present invention, further including a unique identifier; and, FIG. 4 is a schematic diagram illustrating the connection of a preferred embodiment of the system of the present invention to the starter circuit of a motorcycle.

In an alternative preferred embodiment of the present invention, identifier 38 is unique: each individual lock has a specific individualized unique copy of identifier 38 attached to it. In such an embodiment, identifier 38 is uniquely associated with one specific individual lock and detector 26 only recognizes a specific identifier 38 that it has been set to recognize. This is schematically illustrated in FIG. 3C. As shown in FIG. 3C, in such an embodiment, the system of the present invention includes unique identifier 138 attached to lock 12, and detector 26 includes (a) sensor 130 set to specifically recognize only one specific identifier 138, and (b) switch 134 operatively connected to sensor 130. Only when lock 12 with the specific unique identifier 138 attached is placed in immediate proximity to sensor 130 which is set to recognize that unique identifier will switch 134 be closed. Non-limiting examples of unique identifier 138 and sensor 130 include mechanical devices, a machine readable bar code and a scanner, a uniquely identifying magnetic strip and an appropriate scanner, electronic chips, and combinations of a signal transmitter and a receiver (which use, for example, radio, ultrasound or infrared signals.) In such an embodiment, where a unique identifier is used, the system of the present invention also functions as an anti-theft deterrent system.

Figure 4:
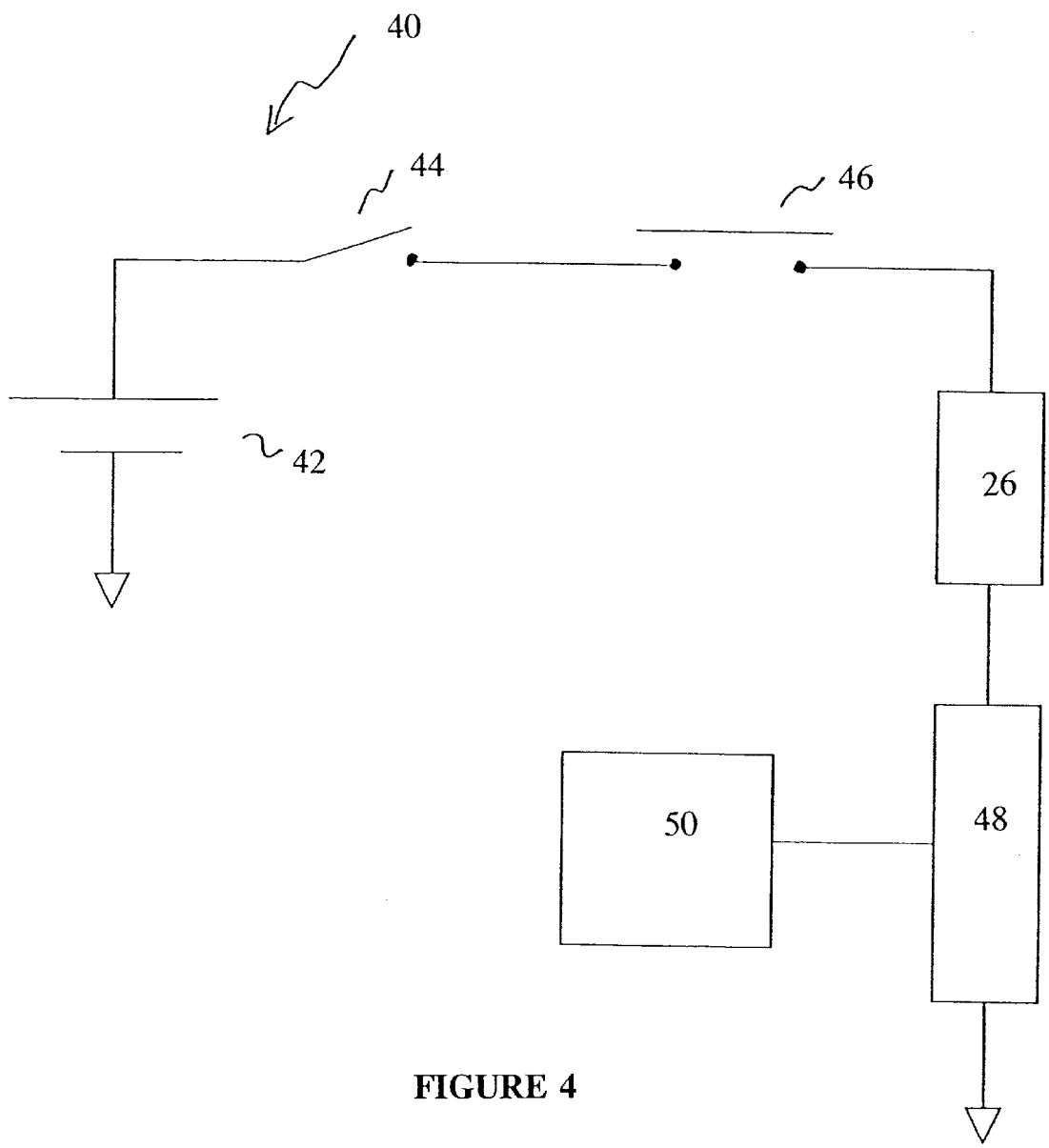

As discussed hereinabove, detector 26 of the present invention is installed in the starter circuit 40 of motorcycle 10 as illustrated in FIG. 4. Starter circuit 40 includes a battery 42, an ignition lock 44, a starter switch 46 (generally located on the handlebars of motorcycle 10), a starter relay 48, and a starter motor 50, in addition to detector 26. Resistance device 32, which is wired in parallel to sensor switch 30 in detector 26, is of a resistance high enough so that resistance device 32 draws sufficient current such that starter relay 48 will not function to start starter motor 50 even if ignition lock 44 and switch 46 are in their operative positions so as to allow current to flow, but switch 30 is open. Resistance device 32 preferably further includes an alert device such as, for example, but not limited to, a beeper, a buzzer, a siren, or a light that also delivers an alert when circuit 40 is closed with switch 30 open, as the resistance of the starter is sufficiently low as to allow resistance device 32 when configured as a beeper to beep. In this way detector 26 does not permit motorcycle 10 to be operated unless switch 30 is closed by the presence of lock 12 in proximity to detector 26.

In an alternate embodiment of the present invention, detector 26 also has a bypass switch 52. Bypass switch 52 is ordinarily left in the open position, but can be closed to bypass sensor switch 30 in the event lock 12 is inadvertently lost or misplaced or is otherwise unable to be returned to storage location 22 but the driver still wishes to be able to operate motorcycle 10.

The circuit and components of detector 26 preferably are enclosed in a housing 54 (FIG. 2) adapted to be attachable to the motorcycle. Housing 54 may be constructed of any of a variety of durable materials including a plastic, ceramic or metal. Housing 54 can be of any shape and is preferably small in size (about 1–4 cm). Detector 26 can be attached to motorcycle 10 by any of a number of connections including, but not limited to, a buckle, band, bracket, clamp, screws, nails or adhesive. Additional components such as, but not limited to, contacts and wires, may be required to establish the connections as described hereinabove. One of ordinary skills in the art would know how to operatively assemble these components.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A safety system for reminding an operator of motorcycle to remove a lock from a disc rotor of a brake of the motorcycle and for reminding the operator to replace the locking a storage location on the motorcycle, the motorcycle requiring function of an electrical circuit for starting the motorcycle, the system comprising:
   (a) a sensing mechanism for sensing that the lock is present in the storage location,
   (b) a switching mechanism, said switching mechanism operatively connected to said sensing mechanism, said switching mechanism operatively connected to the electrical circuit of the motorcycle for controlling current flow through the electrical circuit, and
   (c) a resistance mechanism, said resistance mechanism being connected in a parallel circuit with said switching mechanism, wherein said resistance mechanism is of sufficient resistance such that said resistance mechanism draws sufficient current such that the electrical circuit will function only if said switching mechanism allows current flow through said switching mechanism,
   whereby the motorcycle is prevented from starting unless the lock is present in the storage location.

2. The system of claim 1, wherein said resistance mechanism includes a mechanism for delivering an alert.

3. The system of claim 1, wherein said switching mechanism includes a microswitch.

4. The system of claim 3, wherein said sensing mechanism includes a storage bracket, whereby placement of the lock in said storage bracket serves to operatively engage said microswitch so as to permit current flow through said switching mechanism.

5. The system of claim 1, the system further comprising an identifier mechanism attached to the lock for causing the lock to be detectable by said sensing mechanism.

6. The system of claim 5, wherein said identifier mechanism includes a magnet, and wherein said sensing mechanism senses the presence of a magnet.

7. The system of claim 5, wherein said identifier mechanism includes a mechanism for uniquely distinguishing the lock from any other lock, and said sensing mechanism comprises recognition mechanism for specifically detecting said unique distinguishing mechanism.

8. The system of claim 7, wherein said unique distinguishing mechanism is selected from the group consisting of a machine readable bar code, a uniquely identifiable magnetic strip, an electronic chip, a radio transmitter, an infrared transmitter, and an ultrasound transmitter.

9. The system of claim 1, further comprising a bypass switch, connected to said switching mechanism, for bypassing said switching mechanism.

* * * * *